United States Patent
Shao et al.

(10) Patent No.: US 12,019,652 B2
(45) Date of Patent: Jun. 25, 2024

(54) METHOD AND DEVICE FOR SYNCHRONIZING NODE DATA

(71) Applicant: Jingdong Technology Information Technology Co., Ltd., Beijing (CN)

(72) Inventors: Zhuguang Shao, Beijing (CN); Haibo Sun, Beijing (CN); Haiquan Huang, Beijing (CN); Guangwei Zhao, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 115 days.

(21) Appl. No.: 17/630,620

(22) PCT Filed: Mar. 13, 2020

(86) PCT No.: PCT/CN2020/079088
§ 371 (c)(1),
(2) Date: Jan. 27, 2022

(87) PCT Pub. No.: WO2021/051761
PCT Pub. Date: Mar. 25, 2021

(65) Prior Publication Data
US 2022/0253458 A1    Aug. 11, 2022

(30) Foreign Application Priority Data
Sep. 20, 2019    (CN) .......... 201910894819.X

(51) Int. Cl.
*G06F 16/00*    (2019.01)
*G06F 16/23*    (2019.01)
*G06F 16/27*    (2019.01)

(52) U.S. Cl.
CPC .......... *G06F 16/27* (2019.01); *G06F 16/2358* (2019.01)

(58) Field of Classification Search
CPC .... G06F 16/27; G06F 16/2358; G06F 16/273; H04L 9/3239; H04L 9/50
See application file for complete search history.

(56) References Cited

U.S. PATENT DOCUMENTS 11,423,398 B1 *  8/2022  Mullins .................. G06Q 20/36
2017/0344435 A1  11/2017  Davis
(Continued)

FOREIGN PATENT DOCUMENTS

CN    107103054 A    8/2017
CN    107332876 A    11/2017
(Continued)

OTHER PUBLICATIONS

Jiang et al., "A High Performance Consensus Algorithm for Consortium Blockchain", IEEE, pp. 2379-2386 (Year: 2018).*
(Continued)

*Primary Examiner* — Alexander Khong
(74) *Attorney, Agent, or Firm* — Buchanan Ingersoll & Rooney, PC

(57) ABSTRACT

A method and device for synchronizing node data. The method comprises: determining a target block height according to a local log file used for synchronizing blockchain data of a blockchain system (201); sending a data synchronization request to a target node on the basis of the target block height (202); and in response to receiving update data sent by the target node, writing the update data into a local storage area (203). The method improves the synchronization efficiency of lagging nodes in the blockchain system, and saves network resources.

12 Claims, 7 Drawing Sheets

(56) References Cited

U.S. PATENT DOCUMENTS

| | | | |
|---|---|---|---|
| 2018/0374173 A1 | 12/2018 | Chen et al. | |
| 2020/0120157 A1* | 4/2020 | Xie | H04L 9/0637 |
| 2022/0147337 A1* | 5/2022 | Michelsohn | G06F 11/1433 |

FOREIGN PATENT DOCUMENTS

| | | | |
|---|---|---|---|
| CN | 107944034 A | 4/2018 | |
| CN | 108243253 A | 7/2018 | |
| CN | 108600353 A | 9/2018 | |
| CN | 108805570 A | 11/2018 | |
| CN | 109165229 A | 1/2019 | |
| CN | 109446273 A | 3/2019 | |
| CN | 109522362 A | 3/2019 | |
| CN | 109542980 A | 3/2019 | |
| CN | 109587263 A | 4/2019 | |
| CN | 110113408 A | 8/2019 | |
| CN | 110609872 A | 12/2019 | |
| JP | 2019512778 A | 5/2019 | |
| WO | 2019101246 A2 | 5/2019 | |

OTHER PUBLICATIONS

Chinese Office Action for Chinese Application No. 201910894819.X, dated Sep. 11, 2020, 9 pages.
International Search Report and Written Opinion for International Application No. PCT/CN2020/079088, dated Jun. 23, 2020, 6 pages.

\* cited by examiner

METHOD AND DEVICE FOR SYNCHRONIZING NODE DATA

CROSS-REFERENCE TO RELATED APPLICATIONS

This patent application is a U.S. national stage of International Application No. PCT/CN2020/079088, filed on Mar. 13, 2020, which claims the priority from Chinese Patent Application No. 201910894819.X, filed on Sep. 20, 2019 and titled "Method and Apparatus for Synchronizing Node Data," the contents of each of which applications are hereby incorporated by reference in their entireties.

TECHNICAL FIELD

Embodiments of the present disclosure relate to the field of computer technology, and in particular to a method and apparatus for synchronizing node data.

BACKGROUND OF THE INVENTION

With the development of blockchain technology, blockchains begin to be used for storage and interaction of more and more data. Blockchain is a new application mode of computer technology such as distributed data storage, point-to-point transmission, consensus mechanism, and encryption algorithm. In a blockchain system, a distributed ledger is jointly implemented by a plurality of nodes distributed in different places. Generally, each node records a complete account, and the consistency of storage is ensured through a consensus mechanism.

When a node in the blockchain system exits abnormally or other synchronization abnormalities occur, there are usually two related approaches: one is to copy a missing log of this node from another node and then reload the entire complete log (or execute all transactions); and the second is to copy complete data from another node to the local.

SUMMARY OF THE INVENTION

Embodiments of the present disclosure propose a method and apparatus for synchronizing node data.

In a first aspect, a method for synchronizing node data is provided according to an embodiment of the disclosure. The node includes a backward node in a blockchain system, and the method includes: determining a target block height according to a local log file for synchronizing blockchain data of the blockchain system, where the target block height is used to indicate a processing progress of the blockchain data, and the blockchain data includes data and a block height corresponding to the data; sending a data synchronization request to a target node based on the target block height, where the data synchronization request includes the target block height; and writing, in response to receiving update data sent by the target node, the update data into a local storage area, where a block height corresponding to the update data is greater than the target block height.

In a second aspect, an apparatus for synchronizing node data is provided according to an embodiment of the disclosure. The apparatus includes: one or more processors; and a storage apparatus storing one or more programs thereon, where the one or more programs, when executed by the one or more processors, cause the one or more processors to implement the method according to any embodiment in the first aspect.

In a third aspect, a system for synchronizing node data is provide according to some embodiments of the disclosure. The system includes a backward node and a target node in a blockchain system. The backward node is configured to implement the method according to any embodiment of the first aspect; and the target node is configured to send, in response to receiving the data synchronization request sent by the backward node, the update data to the backward node, where the data synchronization request includes the target block height.

In a fourth aspect, an embodiment of the present disclosure provides a computer readable medium storing a computer program thereon, where the program, when executed by a processor, implements the method according to any one embodiment in the first aspect.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF THE INVENTION

Embodiments of the present disclosure will be further described below in detail in combination with the accompanying drawings. It should be appreciated that detailed embodiments described herein are merely used for explaining the relevant disclosure, rather than limiting the disclosure. In addition, it should be noted that, for the ease of description, only the parts related to the relevant disclosure are shown in the accompanying drawings.

It should be noted that embodiments in the present disclosure and the features in embodiments may be combined with each other on a non-conflict basis.

Figure 1:
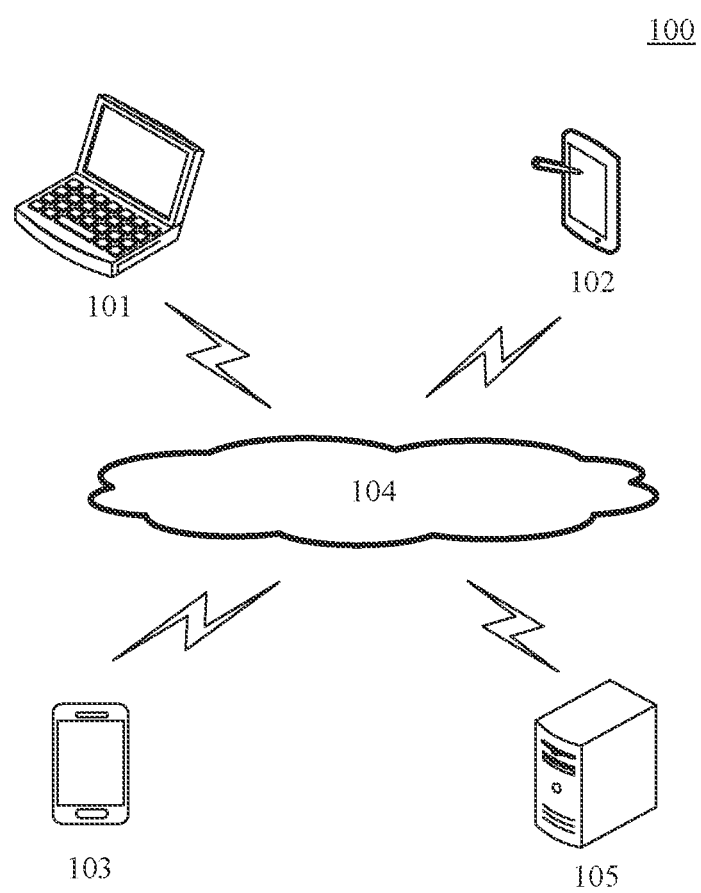
FIG. 1 is an example system architecture diagram to which an embodiment of the present disclosure may be applied.

FIG. 1 shows an example architecture 100 to which a method for synchronizing node data or an apparatus for synchronizing node data of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

The terminal devices 101, 102, 103 interact with the server 105 through the network 104 to receive or send messages and so on. Various communication client applications, such as web browser applications, shopping applications, search applications, instant messaging tools, email clients, social platform software, and text editing applications, may be installed on the terminal devices 101, 102, and 103.

The terminal devices 101, 102, and 103 may be hardware or software. When the terminal devices 101, 102, 103 are hardware, they may be various electronic devices having display screens and supporting network data transmission, including but not limited to smart phones, tablet computers, E-book readers, laptop computers, desktop computers, and so on. When the terminal devices 101, 102, 103 are software, they may be installed in the electronic devices listed above. They may be implemented as a plurality of software pieces or software modules (for example, software pieces or software modules used to provide distributed services), or as a single software piece or software module, which is not limited herein.

The server 105 may be a server that provides various services. The server 105 may be in the same blockchain system as the terminal devices 101, 102, and 103, and each of the server and the terminal devices serves as a node in the blockchain system. When a node in the blockchain is abnormal, local data of the node is missing compared with a main chain. The above abnormal node may be regarded as a backward node, and other nodes may be regarded as normal nodes.

It should be noted that the server may be hardware or software. When the server is hardware, it may be implemented as a distributed server cluster composed of a plurality of servers, or as a single server. When the server is software, it may be implemented as a plurality of software pieces or software modules (for example, software pieces or software modules used to provide distributed services), or as a single software piece or software module, which is not limited herein.

It should be noted that the method for synchronizing node data provided by some embodiments of the present disclosure is generally executed by a backward node in a blockchain system. Correspondingly, the apparatus for synchronizing node data may be arranged in the backward node. The backward node may be either the server 105 or the terminal device 101, 102, 103.

It should be appreciated that the number of the terminal devices, the network and the server in FIG. 1 is merely illustrative. Any number of terminal devices, networks and servers may be provided according to implementation needs.

Figure 2:
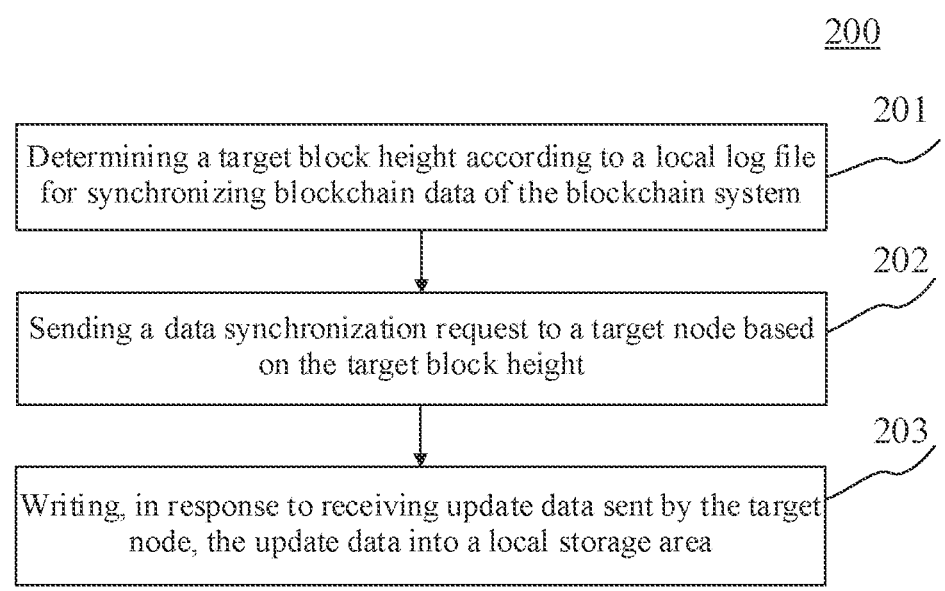
FIG. 2 is a flowchart of an embodiment of a method for synchronizing node data according to the present disclosure.

With further reference to FIG. 2, illustrating a flow 200 of an embodiment of a method for synchronizing node data according to the present disclosure. The method for synchronizing node data includes the following steps:

Step 201: determining a target block height according to a local log file for synchronizing blockchain data of the blockchain system.

In the present embodiment, an executing body of the method for synchronizing node data (as shown in FIG. 1, the terminal device 101, 102, 103 or the server 105 as a backward node) may determine the target block height in various methods according to the local log file. The local log file may be a local log file for synchronizing the blockchain data of the blockchain system. The target block height may be used to indicate a processing progress of the blockchain data. The blockchain data may include data and a block height corresponding to the data. As an example, the executing body may traverse the local log file in reverse order, and determine a maximum block height corresponding to the written local log file as the target block height. Alternatively, the executing body may only determine a maximum value of block heights corresponding to the local log files that are completely and successfully written as the maximum block height, that is, a block that is partially process is abandoned.

It should be noted that the data in the blockchain data may be stored in a form of key-value pair. In the present embodiment, the blockchain data may also include a block height corresponding to the stored key-value pair. The block height may take various forms, which are not limited herein.

It should also be noted that when the nodes in the blockchain system perform data synchronization, the corresponding blockchain data may usually be generated by executing the local log file. The method for generating the corresponding data by executing the local log file is a well-known technology widely studied and applied at present, and detailed description thereof will be omitted.

Step 202: sending a data synchronization request to a target node based on the target block height.

In the present embodiment, the executing body may send the data synchronization request to the target node based on the target block height acquired in step 201. The target node may be any node pre-designated according to actual application requirements. The target node may alternatively be a node determined according to rules, for example, a non-backward node that is in the same blockchain system as the backward node.

In the present embodiment, the executing body may send to the target node the data synchronization request that represents a request to acquire blockchain data having a block height greater than the target block height. The data synchronization request may include the target block height. Alternatively, the data synchronization request may include a log file synchronization request. Alternatively, the data synchronization request may include a blockchain data synchronization request.

In some alternative implementations of the present embodiment, the executing body may send the data synchronization request to the target node according to the following steps:

First step includes executing the local log file to generate blockchain data corresponding to the local log file.

In these implementations, the executing body may generally execute the local log file according to its order to generate the blockchain data corresponding to the executed local log file. A block height corresponding to data in the blockchain data corresponding to the local log file is less than or equal to the target block height.

Second step includes sending, in response to determining that the execution of the local log file is completed, the data synchronization request to the target node.

In these implementations, the executing body may send, in response to determining that the execution of the local log file is completed, the data synchronization request to the target node.

It should be noted that the executing body may use a record of the local log file indicated by the target block height as an end of the execution, that is, a newly synchronized log file is no longer executed.

Step 203: writing, in response to receiving update data sent by the target node, the update data into a local storage area.

In the present embodiment, the data synchronization request may include a log file synchronization request, and in response to receiving a log update file sent by the target node, the executing body may write the log update file into the local log file. A block height corresponding to the log update file is generally greater than the target block height.

In some alternative implementations of the present embodiment, the data synchronization request may include a blockchain data synchronization request, and in response to receiving blockchain update data sent by the target node, the executing body may write the blockchain update data into a local data storage area. A block height corresponding to the blockchain update data is generally greater than the target block height.

It should be noted that, based on the above alternative implementations, executing the local log file, writing the log update file into the local log file, and writing the blockchain update data into the local data storage area may alternatively be executed basically in parallel by starting three threads. Thereby, the time for node synchronization may be reduced, and the speed of node synchronization may be improved, which in turn may help maintaining the stability of the blockchain system.

Figure 3:
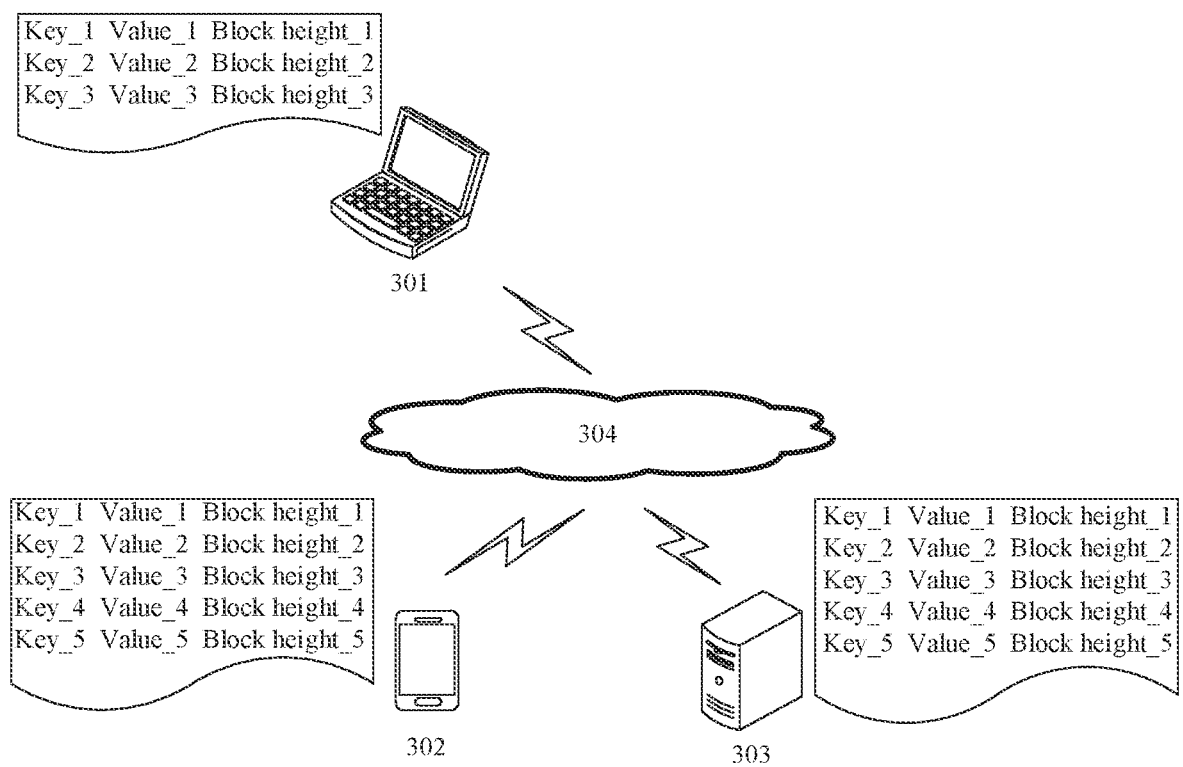
FIG. 3 is a schematic diagram of an application scenario of the method for synchronizing node data according to an embodiment of the present disclosure.

With further reference to FIG. 3, FIG. 3 is a schematic diagram of an application scenario of the method for synchronizing node data according to an embodiment of the present disclosure. In the application scenario of FIG. 3, a blockchain system includes nodes 301, 302, and 303. The nodes 301, 302, and 303 are connected through a network 304. The node 301 traverses a local log file in reverse order to acquire a local current maximum block height of 3. The node 301 regularly acquires the maximum block heights of the node 302 and the node 303, for example, both are 5. In response to determining that the acquired maximum block height of the node 302 or the node 303 is greater than the local current maximum block height, the node 301 may be determined as a backward node. The node 301 may send a data synchronization request containing a local maximum block height of 5 to the node 302. The node 302 may send data corresponding to the block heights of 4 and 5 as update data to the node 301. The node 301 may write the update data into a local storage area.

At present, in an existing approach, a missing log is generally copied and reloaded in the node. Because the cost of log copying is high and log loading needs to be executed locally, the performance is low, which often severely hampers subsequent participation of the node in a consensus process. In the method provided by the above embodiments of the present disclosure, the target block height is determined through the local log file, and the log is not reloaded, thereby saving local computing resources. In addition, in the existing technology, the complete data of other nodes are copied to the local for synchronization, which makes it difficult to de-duplicate local data and consumes network transmission resources. The method provided by the above embodiments of the present disclosure also performs incremental synchronization by writing the received update data into the local storage area, which saves network resources and improves the synchronization efficiency.

Figure 4:
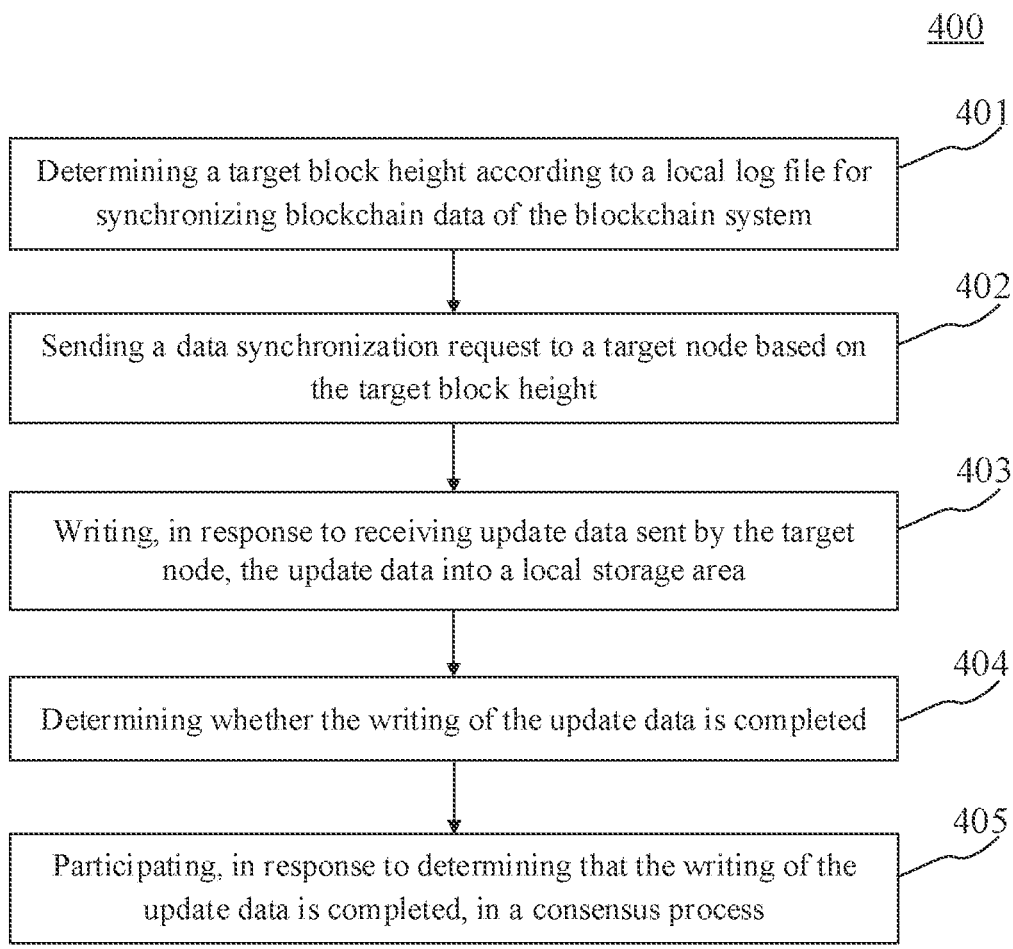
FIG. 4 is a flowchart of another embodiment of the method for synchronizing node data according to the present disclosure.

With further reference to FIG. 4, illustrating a flow 400 of another embodiment of the method for synchronizing node data. The flow 400 of the method for synchronizing node data includes the following steps.

Step 401: determining a target block height according to a local log file for synchronizing blockchain data of the blockchain system.

Step 402: sending a data synchronization request to a target node based on the target block height.

Step 403: writing, in response to receiving update data sent by the target node, the update data into a local storage area.

The above step 401, step 402, and step 403 are respectively consistent with step 201, step 202, and step 203 in the foregoing embodiment. The above description of step 201, step 202, and step 203 also applies to step 401, step 402, and step 403, and detailed description thereof will be omitted.

Step 404: determining whether the writing of the update data is completed.

In the present embodiment, the executing body of the method for synchronizing node data (for example, the terminal device 101, terminal device 102, terminal device 103 or the server 105, which is a backward node, shown in FIG. 1) may determine whether the writing of the update data is completed in various methods. As an example, when the update data is the log update file, in response to determining that the writing of all logs that are included in the target node and are not included in the backward node are fully completed, the executing body may determine that the writing of the update data is completed. As another example, when the update data is the blockchain update data, in response to determining that the writing of all the blockchain update data is completed, the executing body may determine that the writing of the update data is completed. The blockchain update data may usually be generated by the target node according to a local log file of the target node.

Step 405: participating, in response to determining that the writing of the update data is completed, in a consensus process.

In the present embodiment, in response to determining that the writing of the update data is completed, the executing body may determine that the synchronization is completed. Therefore, the executing body no longer belongs to a backward node, and may participate in the subsequent consensus process. The consensus process may include decision-making processes of various consensus algorithms that may be used in the blockchain.

It can be seen from FIG. 4 that the flow 400 of the method for synchronizing node data in the present embodiment reflects the step of determining whether the writing of the update data is completed, and the step of participating in the consensus process in response to determining that the writing of the update data is completed. Therefore, the solution described in the present embodiment may allow nodes where the writing of the update data is completed to participate in the consensus process, thereby realizing node synchronization in the blockchain system and ensuring the smooth progress of the consensus process.

Figure 5:
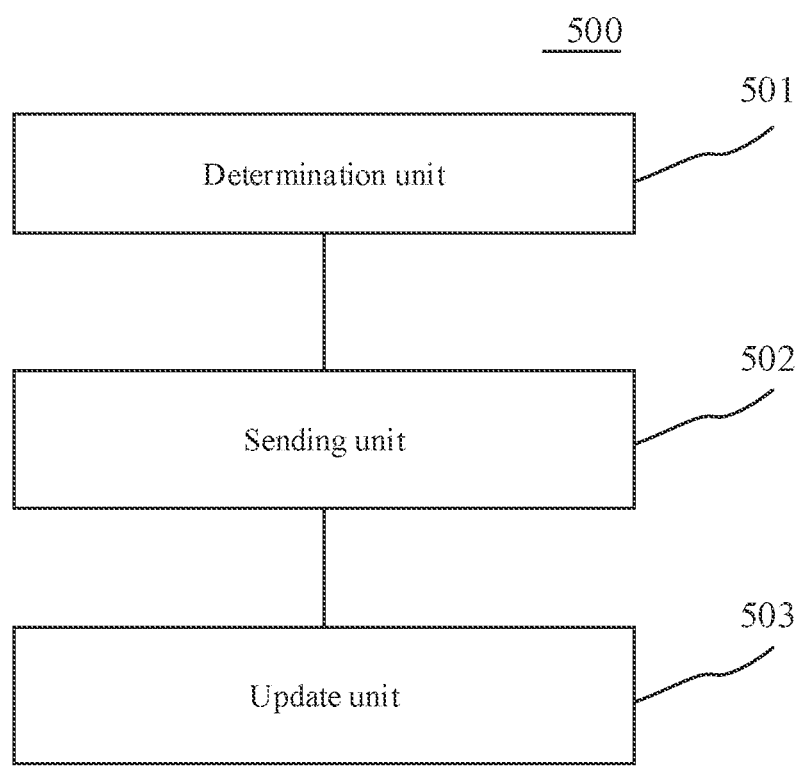
FIG. 5 is a schematic structural diagram of an embodiment of an apparatus for synchronizing node data according to the present disclosure.

With further reference to FIG. 5, as an implementation of the method shown in the above figures, the present disclosure provides an embodiment of an apparatus for synchronizing node data. The apparatus embodiment corresponds to the method embodiment as shown in FIG. 2. The apparatus may be applied to various electronic devices.

As shown in FIG. 5, an apparatus 500 for synchronizing node data provided by the present embodiment includes: a determination unit 501, a sending unit 502 and an update unit 503. The determination unit 501 is configured to determine a target block height according to a local log file for synchronizing blockchain data of the blockchain system. The target block height is used to indicate a processing progress of the blockchain data, and the blockchain data includes data and a block height corresponding to the data. The sending unit 502 is configured to send a data synchronization request to a target node based on the target block height. The data synchronization request includes the target block height. The update unit 503 is configured to write, in response to receiving update data sent by the target node, the update data into a local storage area. A block height corresponding to the update data is greater than the target block height.

In the present embodiment, in the apparatus 500 for synchronizing node data: for the specific processing and the technical effects of the determination unit 501, the sending unit 502 and the update unit 503, reference may be made to the relevant descriptions of step 201, step 202 and step 203 in the embodiment corresponding to FIG. 2 respectively, and detailed description thereof will be omitted.

In some alternative implementations of the present embodiment, the sending unit 502 may include: an executing module (not shown in the figure), and a sending module (not shown in the figure). The executing module may be configured to execute the local log file to generate blockchain data corresponding to the local log file. A block height corresponding to data in the blockchain data corresponding to the local log file is generally smaller than or equal to the target block height. The sending module may be configured to send, in response to determining that the execution of the local log file is completed, the data synchronization request to the target node.

In some alternative implementations of the present embodiment, the data synchronization request may include a log file synchronization request. The update unit 503 may be further configured to: write, in response to receiving a log update file sent by the target node, the log update file into the local log file. A block height corresponding to the log update file may be greater than the target block height.

In some alternative implementations of the present embodiment, the data synchronization request may include a blockchain data synchronization request. The update unit 503 may be further configured to: write, in response to receiving blockchain update data sent by the target node, the blockchain update data into a local data storage area. A block height corresponding to the blockchain update data may be greater than the target block height.

In some alternative implementations of the present embodiment, the apparatus 500 for synchronizing node data may be further configured to: determine whether the writing of the update data is completed; and participate, in response to determining that the writing of the update data is completed, in a consensus process.

In the apparatus provided by the above embodiment of the present disclosure, through a backward node in a blockchain system, the determination unit 501 determines a target block height according to a local log file for synchronizing blockchain data of the blockchain system, where the target block height is used to indicate a processing progress of the blockchain data, and the blockchain data includes data and a block height corresponding to the data. Then, the sending unit 502 sends a data synchronization request to a target node based on the target block height, where the data synchronization request includes the target block height. In response to receiving update data sent by the target node, the update unit 503 writes the update data into a local storage area, where a block height corresponding to the update data is greater than the target block height. Thus, the synchronization efficiency of backward nodes in a blockchain system is improved, and network resources are saved.

Figure 6:
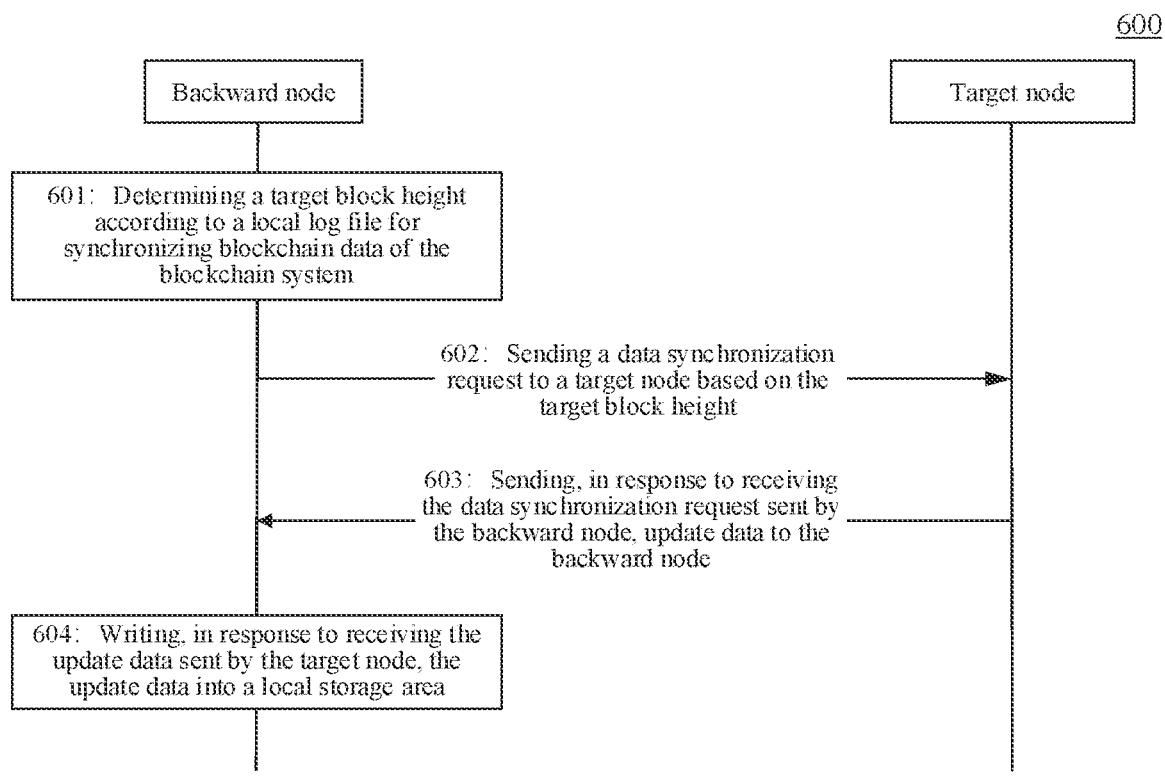
FIG. 6 is a sequence diagram of interaction between devices in an embodiment of a system for synchronizing node data according to the present disclosure.

With further reference to FIG. 6, illustrating a sequence 600 of interaction between various devices in an embodiment for synchronizing node data. The system for synchronizing node data may include: a backward node (for example, the terminal device 101 shown in FIG. 1), and a target node (for example, the server 105 shown in FIG. 1). The backward node may be configured to implement the method for synchronizing node data as described in the foregoing embodiments. The target node may be configured to send the update data to the backward node in response to receiving the data synchronization request sent by the backward node. The data synchronization request may include the target block height.

In some alternative implementations of the present embodiment, the data synchronization request may include the log file synchronization request. The target node may be further configured to: determining, in response to receiving the log file synchronization request sent by the backward node, an initial sending position of a local log file of the target node based on the target block height; and sending, based on the initial sending position, the log data corresponding to the block having a block height greater than the target block height to the backward node. The initial sending position may be used to indicate a dividing point of log data corresponding to a block having a block height greater than the target block height.

In some alternative implementations of the present embodiment, the data synchronization request may include the blockchain data synchronization request. The target node may be further configured to: determine, in response to receiving the blockchain data synchronization request sent by the backward node, blockchain data having a block height greater than the target block height as blockchain update data; and send the blockchain update data to the backward node.

Based on the above alternative implementations, the target node may be further configured to: store, in response to receiving the blockchain data synchronization request sent by the backward node, the blockchain data having the block height greater than the target block height as the blockchain update data in a buffer array; sort the blockchain update data in the buffer array based on the block heights to generate a blockchain update data list; and send the blockchain update data to the backward node according to an order of the blockchain update data list.

As shown in FIG. 6, in step 601, the backward node determines a target block height according to a local log file for synchronizing blockchain data of the blockchain system.

In step 602, the backward node sends a data synchronization request to a target node based on the target block height.

In step 603, the target node sends, in response to receiving the data synchronization request sent by the backward node, the update data to the backward node.

In the present embodiment, in response to receiving the data synchronization request sent by the backward node, the target node may send the update data to the backward node in various methods. The data synchronization request may include the target block height.

In some alternative implementations of the present embodiment, the data synchronization request may include the log file synchronization request. The target node may also send the update data to the backward node through the following steps.

First, determining, in response to receiving the log file synchronization request sent by the backward node, an initial sending position of a local log file of the target node based on the target block height.

In these implementations, the target node may locate a record in the local log file based on the target block height to determine the initial sending position. The initial sending position may be used to indicate a dividing point of log data corresponding to a block having a block height greater than the target block height. For example, if the target block height is 3, the initial sending position may be used to indicate a record corresponding to a block having a block height of 4.

Secondly, sending, based on the initial sending position, the log data corresponding to the block greater than the target block height to the backward node.

In these implementations, the target node may send the log data corresponding to the block having a block height greater than the target block height to the backward node piece by piece according to an order of logs. It may be understood that the target node may also package and send the log data, which is not limited herein.

In some alternative implementations of the present embodiment, the data synchronization request may include the blockchain data synchronization request. The target node may also send the update data to the backward node through the following steps.

First step includes determining, in response to receiving the blockchain data synchronization request sent by the backward node, blockchain data having a block height greater than the target block height as blockchain update data.

Second step includes: sending the blockchain update data to the backward node.

Alternatively, the target node may alternatively send the update data to the backward node through the following steps.

First step includes: storing, in response to receiving the blockchain data synchronization request sent by the backward node, the blockchain data having the block height greater than the target block height as the blockchain update data in a buffer array.

Based on the above alternative implementations, in response to receiving the blockchain data synchronization request sent by the backward node, the target node may traverse the locally stored pieces of blockchain data one by one. Based on the block height corresponding to the blockchain data, the target node may determine whether the block height corresponding to the blockchain data is greater than the target block height. Then, the target node may store the blockchain data having the block height greater than the target block height as the blockchain update data in the buffer array.

Second step includes: sorting the blockchain update data in the buffer array in an order of the block heights to generate a blockchain update data list. As an example, the blockchain update data list may be arranged in an ascending order of the block heights.

Third step includes sending the blockchain update data to the backward node according to an order of the blockchain update data list. Alternatively, in response to completion of sending the blockchain update data in the blockchain update data list, the target node may alternatively check whether there is newly generated data. If there is the newly generated data, the newly generated data continues to be sent to the backward node.

In step 604, the backward node writes, in response to receiving the update data sent by the target node, the update data into a local storage area.

The above step 601, step 602, and step 604 are respectively consistent with step 201, step 202, and step 203 in the foregoing embodiment. The above description of step 201, step 202, and step 203 also applies to step 601, step 602, and step 604, and detailed description thereof will be omitted.

The system for synchronizing node data provided by the above embodiment of the present disclosure, first the backward node determines the target block height according to the local log file for synchronizing blockchain data of the blockchain system. Then, the backward node sends the data synchronization request to the target node based on the target block height. Next, the target node sends, in response to receiving the data synchronization request sent by the backward node, the update data to the backward node. After that, the backward node writes, in response to receiving the update data sent by the target node, the update data into the local storage area. Thus, through the interaction between the backward node and the target node, data synchronization of the backward node is realized, the synchronization time is reduced, and the efficiency is improved. Furthermore, the synchronization and consistency of the node data in the blockchain system ensures the smooth progress of the consensus process.

Figure 7:
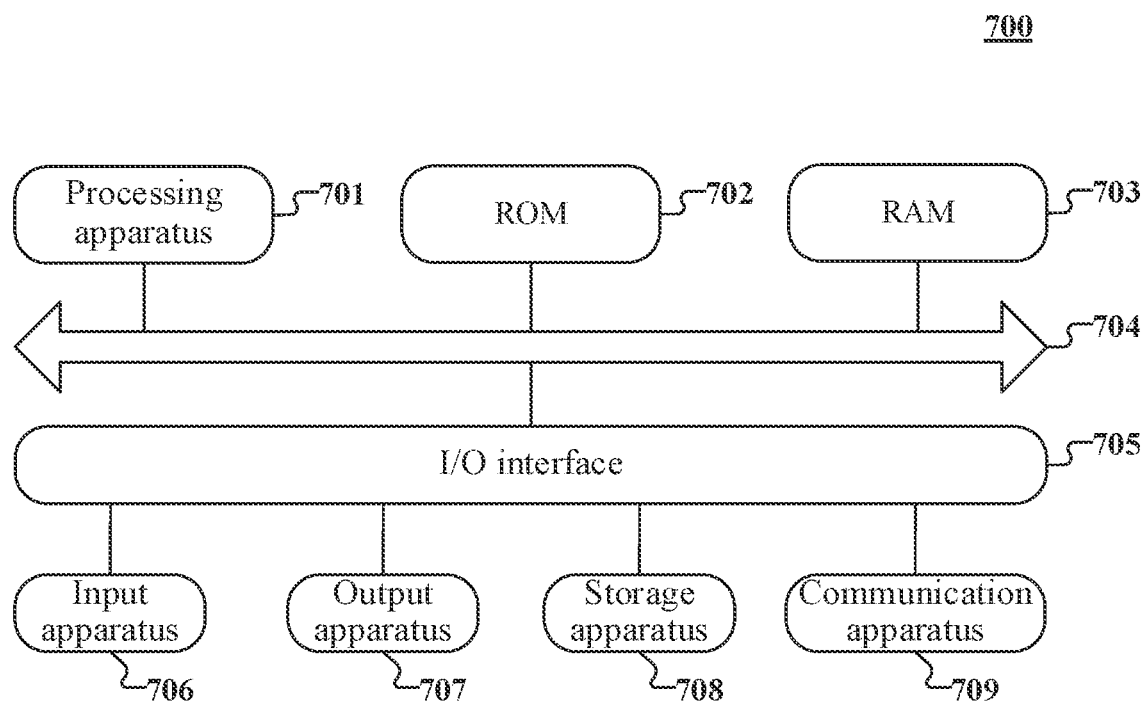
FIG. 7 is a schematic structural diagram of an electronic device adapted to implement embodiments of the present disclosure.

With further reference to FIG. 7, illustrating a schematic structural diagram of an electronic device (for example, the terminal device in FIG. 1) 700 suitable for implementing the embodiments of the present disclosure. The terminal devices in some embodiments of the present disclosure may include, but are not limited to, mobile terminals such as mobile phones, notebook computers, digital broadcast receivers, PDAs (personal digital assistants), PADs (tablets), PMPs (portable multimedia players), vehicle-mounted terminals (for example, vehicle-mounted navigation terminals) and fixed terminals such as desktop computers. The terminal device shown in FIG. 7 is only an example, and should not bring any limitation to the functions and scope of use of the embodiments of the present disclosure.

As shown in FIG. 7, the electronic device 700 may include a processing apparatus 701 (e.g., a central processing unit or a graphics processing unit), which may execute various appropriate actions and processes in accordance with a program stored in a read-only memory (ROM) 702 or a program loaded into a random access memory (RAM) 703 from a storage apparatus 708. The RAM 703 further stores various programs and data required by operations of the electronic device 700. The processing apparatus 701, the ROM 702, and the RAM 703 are connected to each other through a bus 704. An input/output (I/O) interface 705 is also connected to the bus 704.

In general, the following apparatuses may be connected to the I/O interface 705: an input apparatus 707 including a touch screen, a touch pad, a keyboard, a mouse, a camera, a microphone, an accelerometer, a gyroscope, or the like; an output apparatus 707 including a liquid crystal display device (LCD), a speaker, a vibrator, or the like; a storage apparatus 708 including a magnetic tape, a hard disk, or the like; and a communication apparatus 709. The communication apparatus 709 may allow the electronic device 700 to exchange data with other devices through wireless or wired communication. While FIG. 7 shows the electronic device 700 having various apparatuses, it should be understood that it is not necessary to implement or provide all of the apparatuses shown in the figure. More or fewer apparatuses may be alternatively implemented or provided. Each block shown in FIG. 7 may represent an apparatus, or represent a plurality of apparatuses as required.

In particular, according to some embodiments of the present disclosure, the process described above with reference to the flow chart may be implemented as a computer software program. For example, some embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the above functions as defined by the method of some embodiments of the present disclosure.

It should be noted that the computer readable medium of some embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus or element. In some embodiments of the present disclosure, the computer readable signal medium may include a data signal in the base band or propagating as a part of a carrier wave, in which a computer readable program code is carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program code contained on the computer readable medium may be transmitted with any suitable medium, including but not limited to: wire, an optical cable, a RF (radio frequency) medium etc., or any suitable combination of the above.

The computer readable medium may be included in the electronic device; or may alternatively be present alone and not assembled into the electronic device. The computer readable medium carries one or more programs that, when executed by the electronic device, cause the electronic device to: determine a target block height according to a local log file for synchronizing blockchain data of the blockchain system, where the target block height is used to indicate a processing progress of the blockchain data, and the blockchain data includes data and a block height corresponding to the data; send a data synchronization request to a target node based on the target block height, where the data synchronization request includes the target block height; and write, in response to receiving update data sent by the target node, the update data into a local storage area, where a block height corresponding to the update data is greater than the target block height.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor, for example, may be described as: a processor, including a determination unit, a sending unit and an update unit, where the names of these units do not constitute a limitation to such units themselves in some cases. For example, the determination unit may alternatively be described as "a unit of determining a target block height according to a local log file for synchronizing blockchain data of the blockchain system".

The above description only provides explanation of the preferred embodiments and the employed technical principles of the present disclosure. It should be appreciated by those skilled in the art that the inventive scope of the present disclosure is not limited to the technical solutions formed by particular combinations of the above-described technical features, and should also cover other technical solutions formed by any combinations of the above-described technical features or equivalent features thereof without departing from the above inventive concepts, for example, technical solutions formed by interchanging the above-described features with, but not limited to, technical features with similar functions disclosed in the present disclosure.

What is claimed is:

1. A method for synchronizing node data, the node comprising a backward node in a blockchain system, and the method comprising:
   determining a target block height according to a local log file of the backward node for synchronizing blockchain data of the blockchain system, wherein the target block height is used to indicate a processing progress of the blockchain data, and the blockchain data comprises data and a block height corresponding to the data;
   sending a data synchronization request to a target node based on the target block height, wherein the data synchronization request comprises the target block height; and
   writing, in response to receiving update data sent by the target node, the update data into a local storage area of the backward node, wherein a block height corresponding to the update data is greater than the target block height,
   wherein the sending a data synchronization request to a target node based on the target block height, comprises:
   executing the local log file to generate blockchain data corresponding to the local log file, wherein a block height corresponding to the data in the blockchain data corresponding to the local log file is smaller than or equal to the target block height; and
   sending, in response to determining that the executing of the local log file is completed, the data synchronization request to the target node.

2. The method according to claim 1, wherein the data synchronization request comprises a log file synchronization request; and
   the writing, in response to receiving update data sent by the target node, the update data into a local storage area, comprises:
   writing, in response to receiving a log update file sent by the target node, the log update file into the local log file, wherein a block height corresponding to the log update file is greater than the target block height.

3. The method according to claim 1, wherein the data synchronization request comprises a blockchain data synchronization request; and
   the writing, in response to receiving update data sent by the target node, the update data into a local storage area, comprises:
   writing, in response to receiving blockchain update data sent by the target node, the blockchain update data into a local data storage area of the backward node, wherein a block height corresponding to the blockchain update data is greater than the target block height.

4. The method according to claim 1, wherein the method further comprises:
   determining whether the writing of the update data is completed; and
   participating, in response to determining that the writing of the update data is completed, in a consensus process.

5. An apparatus for synchronizing node data, the node comprising a backward node in a blockchain system, and the apparatus comprising:
   at least one processor; and
   a memory storing instructions, wherein the instructions when executed by the at least one processor, cause the at least one processor to perform operations, the operations comprising:
   determining a target block height according to a local log file of the backward node for synchronizing blockchain data of the blockchain system, wherein the target block height is used to indicate a processing progress of the blockchain data, and the blockchain data comprises data and a block height corresponding to the data;
   sending a data synchronization request to a target node based on the target block height, wherein the data synchronization request comprises the target block height; and
   writing, in response to receiving update data sent by the target node, the update data into a local storage area of the backward node, wherein a block height corresponding to the update data is greater than the target block height,
   wherein the sending a data synchronization request to a target node based on the target block height, comprises:
   executing the local log file to generate blockchain data corresponding to the local log file, wherein a block height corresponding to the data in the blockchain data corresponding to the local log file is smaller than or equal to the target block height; and
   sending, in response to determining that the executing of the local log file is completed, the data synchronization request to the target node.

6. The apparatus according to claim 5, wherein the data synchronization request comprises a log file synchronization request; and the writing, in response to receiving update data sent by the target node, the update data into a local storage area, comprises:
   writing, in response to receiving a log update file sent by the target node, the log update file into the local log file, wherein a block height corresponding to the log update file is greater than the target block height.

7. The apparatus according to claim 5, wherein the data synchronization request comprises a blockchain data synchronization request; and the writing, in response to receiving update data sent by the target node, the update data into a local storage area, comprises:
   writing, in response to receiving blockchain update data sent by the target node, the blockchain update data into a local data storage area of the backward node, wherein a block height corresponding to the blockchain update data is greater than the target block height.

8. The apparatus according to claim 5, wherein the operations further comprise:
   determining whether the writing of the update data is completed; and
   participating, in response to determining that the writing of the update data is completed, in a consensus process.

9. A system for synchronizing node data, comprising a backward node and a target node in a blockchain system;
   the backward node being configured to determine a target block height according to a local log file thereof for synchronizing blockchain data of the blockchain system, wherein the target block height is used to indicate a processing progress of the blockchain data, and the blockchain data comprises data and a block height corresponding to the data; send a data synchronization request to a target node based on the target block height, wherein the data synchronization request comprises the target block height; and write, in response to receiving update data sent by the target node, the update data into a local storage area of the backward node, wherein a block height corresponding to the update data is greater than the target block height; and
   the target node being configured to send, in response to receiving the data synchronization request sent by the backward node, the update data to the backward node, wherein the data synchronization request comprises the target block height, wherein the target node is further configured to:

in response to receiving the blockchain data synchronization request sent by the backward node, store the blockchain data with a block height greater than the target block height as the blockchain update data into a buffer array;

sort the blockchain update data in the buffer array in an order of block heights to generate a blockchain update data list; and send the blockchain update data to the backward node according to the order of the blockchain update data list.

10. The system according to claim 9, wherein the data synchronization request comprises the log file synchronization request; and the target node is further configured to:

determine, in response to receiving the log file synchronization request sent by the backward node, an initial sending position of a local log file of the target node based on the target block height, wherein the initial sending position is used to indicate a dividing point of log data corresponding to a block having a block height greater than the target block height; and send, based on the initial sending position, the log data corresponding to the block having the block height greater than the target block height to the backward node.

11. The system according to claim 9, wherein the data synchronization request comprises the blockchain data synchronization request; and the target node is further configured to:

determine, in response to receiving the blockchain data synchronization request sent by the backward node, blockchain data having a block height greater than the target block height as blockchain update data; and send the blockchain update data to the backward node.

12. A non-transitory computer-readable medium, storing a computer program thereon, wherein the program, when executed by a processor, implements the method according to claim 1.

* * * * *